United States Patent Office 3,376,550
Patented Apr. 2, 1968

3,376,550
CODE SIMULATOR
Mei-Goon Wong, Los Angeles, and Douglas R. Maure, Pasadena, Calif., assignors, by mesne assignments, to Lear Siegler, Inc., Santa Monica, Calif., a corporation of Delaware
Filed May 17, 1963, Ser. No. 281,147
17 Claims. (Cl. 340—172.5)

This invention relates to a code simulator, and more particularly to a versatile testing unit capable of producing electrical pulses and other coded signals in a variety of formats while simulating a variety of adverse effects approximating actual operating conditions.

Modern telemetry systems are required to handle large quantities of information transmitted in coded form from a sending station to a receiving station which must then acquire and preserve the coded signals and later perform various operations in deriving the information from the coded signals. Often the transmitted signals may be mixed with noise, be subjected to frequency shifts or jitter or be blanked out partially or completely for short intervals due to uncontrollable external factors. Also, it is not uncommon for a single system to be required to handle many different types of coded signals, sometimes in multiplex on a single transmission channel. Therefore, such telemetry receivers, as well as various data processing systems employed in other fields, require large quantities of complicated circuitry in order to handle adequately and accurately incoming information under these conditions.

Even though complex systems for the above purposes are designed and built with utmost care and precision with each individual component being thoroughly tested, it is usually considered essential to check out the completely assembled system prior to each use as an operational unit. Previously, such tests have been carried out by introducing signals in sample code formats one at a time to the system input and comparing the output signals from the system with previously determined standards. In some instances, the different basic formats and variations of the basic formats may be assembled in a specified order on a paper or a magnetic tape, memory drum, or other recording medium to be later read out to the input of a system under test. Inasmuch as most telemetry systems are now designed to have broad capabilities, a very large number of different data formats must be first generated and then recorded in sequence to provide even a limited checkout of all aspects of the system. Furthermore, once such a checkout sequence had been recorded, it becomes very difficult to achieve modifications and slight variations of the recorded formats which might prove helpful in probing a possible source of trouble.

A more versatile but also more costly testing unit for system checkout may be achieved through use of a general purpose computer, should one be available for such purposes. However, the general purpose computer must be specially programmed to fit the requirements of system checkout and many basic operations must be performed in a roundabout, time consuming manner which creates difficult programming problems and slowdowns in the test cycle. Also, in spite of the great versatility of most general purpose computers, it may often be necessary to provide additional equipment to achieve certain common test objectives. For example, most general purpose computers have input and output channels capable of handling only one or at most a few specialized data codes, usually at a single basic frequency. Due to the fact that a digital computer usually operates from a set clock frequency which must be rigidly maintained for a proper operation of all of the computer components, the rate of occurrence or frequency of the signals generated is limited. Therefore, even though a general purpose digital computer can usually provide data frequencies which are multiples and submultiples of this basic clock frequency, slight frequency shifts or jitter in the data, such as may be the result of Doppler or atmospheric effects on an actual signal, are not generally available.

It is a general object of this invention to provide a highly versatile data simulator unit for data system checkout.

Another object of this invention is to provide an improved data simulator for a checkout system which operates on digital principles, but which is capable of providing checkout data in a continuous frequency range.

Yet a further object of this invention is to provide an improved circuit for converting digital pulse information into pulse duration modulated or pulse amplitude modulated signals.

Still another object of this invention is to provide a random access memory system capable of providing variable sequences of pulse code information for use in a checkout system.

The above and other objects are accomplished in accordance with the invention by the provision of a data simulator including a random access digital memory for the storage of multiple digit sequences, i.e., multibit words which may be read out in a variable order and at variable speed to produce a coded pulse train for checkout of a data system. In accordance with a preferred form of the invention, the memory consists of a magnetic core matrix for storing multibit binary words at different address positions in a predetermined sequence. Originally, the words to be stored are entered into the memory from a keyboard, toggle switches, magnetic tape, paper tape or other computer type input device to be temporarily stored in an input/output or data register. The address, that is, the word location within the memory at which the word is to be stored, is supplied to an address register so that when a "write" signal is applied, the word in the data register is stored in the memory location identified by the address register. After the memory has been filled with the desired binary word information, the checkout system can then be switched to an "operate" mode to start shifting the stored words from the memory back to the data register where the entire word is temporarily stored.

The different words contained within the memory may be either data words or instruction words, with the first word in the address sequence being a data word followed by an instruction word or words, or by another data word. Thereafter the instruction may be followed by either a data word or another instruction word. With the "operate" program started, the first word is read out of the memory to the data register where it may be recognized as a data word and routed in parallel to the storage elements of a shift register. Next the address register is automatically shifted to indicate the next word position, which word is then shifted from the memory to the data register. This word may be recognized as an instruction word which may be to repeat the next data word a given number of times, to jump from the present address to a new address, or jump to a new address and modify the instruction word found there.

According to another aspect of the invention data words transferred to the shift register in parallel may either be shifted out serially as pulse code modulated signals or may be converted to analog voltages as pulse amplitude modulated or pulse duration modulated signals, or even as XY coordinate analogue signals, depending upon the output mode chosen. The rate at which data is shifted from the shift register is controlled by a variable oscillator frequency which is independent of the basic commutation rate in obtaining words from the memory. The data bits from the shift register are then applied through output control circuits in which various signal perturbations, such as noise, amplitude, baseline variation, blanking, and rate jitter, may be combined with the basic signal output to simulate environmental operating conditions.

From a checkout system data simulator constructed in accordance with the invention, word combinations including supercommutated, subcommutated, sub-subcommutated, cross-strapped subcommutated, etc. data trains can be formed from a limited number of data words and instruction words contained within the core memory. In spite of the fact that the memory has a finite capacity so that the number of instruction words limits the number of data words, and vice versa, complex formats can be programmed with a few instruction words thereby leaving the balance of the memory for the storage of special words or additional program formats.

A better understanding of the invention may be had from a reading of the following detailed description in conjunction with an inspection of the accompanying drawings, in which.

Inasmuch as many of the elements, as well as their interconnection to perform various functions, are well known in the art of computer technology and may be implemented by any of a number of well known computer techniques, such elements will not herein be described in detail in the interest of brevity, except where such detailed explanation of one example will aid a complete understanding of the invention. It will be recognized by those skilled in the art that such detailed explanation as is herein included is for the purposes of illustration only, and is not meant as a limitation on the scope of the invention as expressed in the appended claims. It should also be recognized that certain details are best illustrated by means of functional diagrams showing the operation of various system components.

Figure 1:
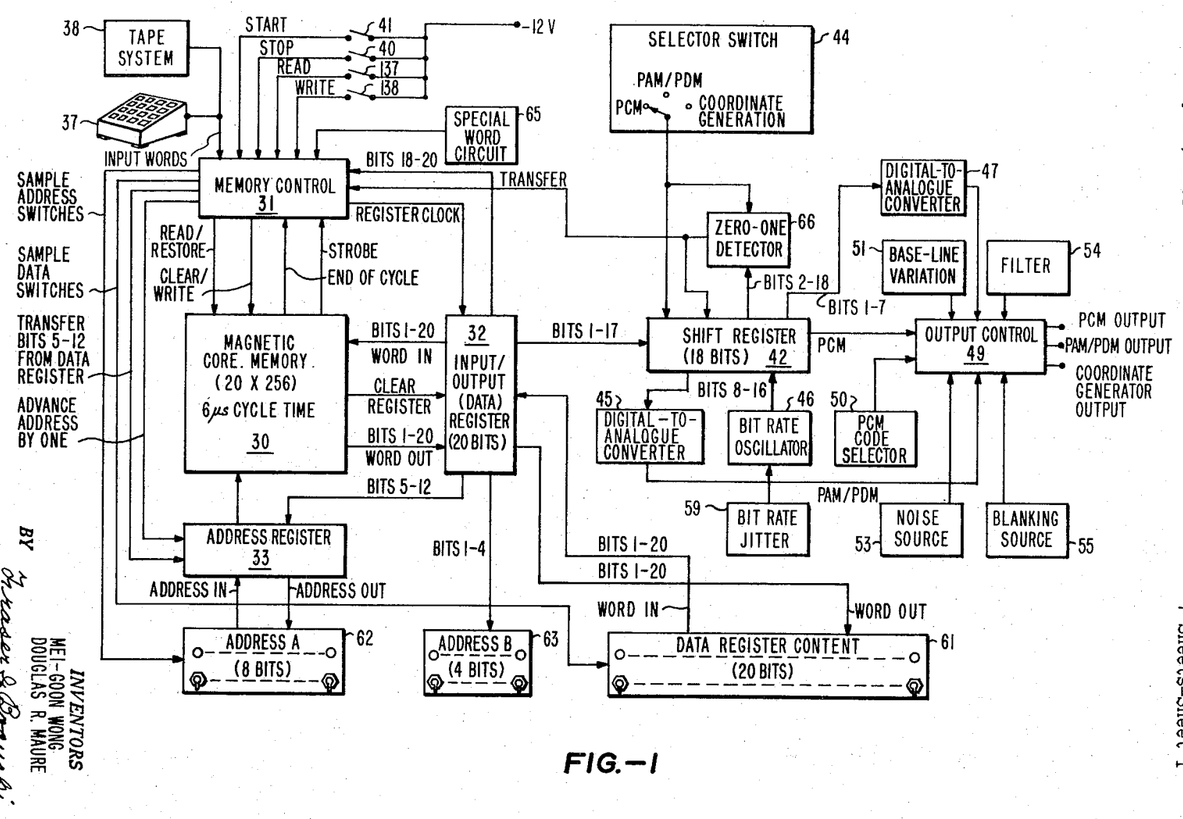
FIG. 1 is a generalized block diagram illustration of a data simulator for a checkout system in accordance with the invention.

Referring now to FIG. 1, which illustrates in block diagram form the principal elements of a preferred embodiment of a checkout system code simulator in accordance with the invention, a magnetic core memory 30 containing two hundred fifty-six words with twenty binary bits per word is interconnected with a memory control circuit 31, an input/output or data register 32, and an address register 33 to provide a random access memory with nondestructive readout features. In addition, various manually operated control switches and data display devices are interconnected with the basic memory element to provide external control and monitoring operation of the memory.

Originally the data or instruction words to be stored within the magnetic core memory 30 are inserted either in a word-by-word selective manner from a conventional keyboard 37 or automatically in sequence from a tape or other system 38 containing a prerecorded input code. The input words inserted are assembled in their proper positions in the input/output or data register 32 (hereinafter referred to as the data register) and then inserted into the memory 30 at the word position designated by the address register 33. During the time that input words are being inserted, the manual stop switch 40 is closed to provide operating voltages to the various system components necessary for this operation.

After the memory 30 has been filled with the desired data and instruction words and the output of the system connected to the device under test, the manual stop switch 40 may be opened and the start switch 41 closed to start the automatic operation of the system. The address register 33 contains a number corresponding to the address position of the first word so that upon initiation of a read/restore cycle by the memory control 31, the first word is read out in parallel to the data register 32. This first word, which should be a data word, contains an instruction (bits 18–20) for identifying the type of information contained in the rest of the word (bits 1–17). Inasmuch as this first word is a data word, the data portion (bits 1–17) is transferred in parallel to the shift register 42 to generate an output code having a format as determined by the setting of a three position selector switch 44. With the selector switch 44 set in the PCM mode (as shown in the drawings), a bit rate oscillator 46 supplies shifting pulses at a selectable rate to shift the data bits out in series from the shift register 42. With the selector switch 44 moved to the PAM/PDM mode position, the bits 8–16 are applied to a digital-to-analog converter 45 to control the amplitude of the output pulses while the other seven bit positions in the shift register are used in counter fashion to count the pulses from the bit rate oscillator 46 to control the output pulse duration. In the coordinate generation mode, another digital-to-analog converter 47 is employed so that the numbers represented by the bits 1–7 and by the bits 8–16 and can be used to generate the voltage levels indicative of two coordinate values.

In each of the selected modes, the outputs derived from the shift register 42 are fed to an output control circuit 49 wherein the basic output code format may be further modified by conventional methods. For example, the basic output code obtained from the PCM mode may be converted from a "nonreturn-to-zero" pulse code to any of the other commonly employed pulse codes such as "return-to-zero," bi-phase, or others depending upon the connections made with PCM code selector circuit 50. The base line variation circuit 51 may be used to vary the DC voltage level at which the pulses are produced. Signals of the desired pulse code may then be subjected to noise from a random noise source 53 by means of a conventional mixer circuit included in the output control 49. Selective filtering of the output signal may also be achieved by connection with an appropriate filter circuit 54, and a selective blanking effect obtained by passing the output signal through a gate which may be inhibited by signals from a blanking source 55. Additionally, the frequency of the output pulses may be varied by changing the frequency of the bit rate oscillator 46; this oscillator 46 may be of the voltage controlled variety so that a signal from the bit rate jitter source 59 may be used to simulate frequency shift effects in the output data, such as may be caused by Doppler effects and atmospheric conditions.

In many instances, it is desirable to obtain a visual display of the information contained in separate parts of the system so that the operation of the system may be monitored and selective changes made in the data or instruction words as desired. For this purpose, the separate bits of the data register 32 are connected to respective display lights on a data register content panel 61. This allows the system to be stopped at any point in its operation and the content of an entire word contained in the data register 32 to be scrutinized. If some selective changes are desired, toggle switches located below each of the lights are provided so that one or more of the binary bits may be changed. A similar output panel 62 containing eight lights along with associated toggle switches is provided for monitoring the content of the address register 33, and accomplishing desired changes in the address count. Another address panel 63 may be provided for the bits 1-4 from the data register 32 or for any other selective group of word bits desired, and these elements may be used as explained hereinafter in conjunction with a special word circuit 65 to effect certain dynamic changes in the format during operation.

After the first word has been transferred from the memory 30 through the data register 32 to the shift register 42, the system is then ready for the next operation. Typically, the system operates to advance the count in the address register 33 by a binary one count and move to the next address position. However, before this is done the first word, which is still contained in the data register 32 is restored to its original position in the magnetic core memory 30. After the address count has advanced, another read pulse is obtained from the memory control and the second word is read out to the data register 32. This second word may be an instruction which commands the system to perform certain operations before transferring the next data word to the shift register 42. The instructions are of various types, the particular type being determined by the binary code number contained in the binary bits 18-20 of the word. The basic instructions are: REPEAT, which commands the memory to read out the words stored at a given address in the memory R times; JUMP, which commands the system to move to a new address and read out the word contained there, this instruction providing the random access to the memory; MODIFY, which is always used in conjunction with the JUMP instruction for generation of sub-commutated and/or sub-sub-commutated signals and which commands that the system change the word content at a particular address in the memory; DATA, which specifies that the bits 1-17 are to be transferred to the shift register 42 when commanded by a signal from a zero-one detector 66, which indicates that the previous word has been transferred from the shift register 42; WORD SYNC, which commands basically the same functions as the DATA instruction except that an "end of word" pulse is generated when the last bit of a word pattern is shifted out from the shift register 42; DYNAMIC DATA, which is used to generate changing bit patterns from a single word.

The particular significance of each of these instructions will be discussed hereinafter in conection with the more detailed showings of the system circuitry and the graphical illustrations of the different instruction word contents in FIG. 7. Generally each of the words is first read out to the data register 32 wherein the instruction contained in the bits 18-20 is interrogated to determine the function to be performed. After this determination has been made, the word or a modification of the original word is returned to be restored in the memory 30. Likewise, for each word, the count in the address register 33 is changed in accordance with the instructions contained in the word either by advancing the count by one or by transferring the totally new address contained in bits 5-12 of the data register 32.

Assuming that a first data word has already been placed in the shift register 42, the system continues to carry out a sequence of memory cycle operations once each six microseconds in accordance with the succeeding instruction words until a word containing data to be supplied to the shift register 42 again appears in the data register 32. At such time, the shift register 42 might still contain some of the data bits from the previous data word which had not yet been shifted out so that the new data word may be inserted. Therefore, the system ceases its continuous operation to wait for a signal from the zero-one detector 66, which indicates that the shaft register 42 is now ready to receive an additional block of data from the data register 32. The data bits may then be transferred, and the continuous operation of the system resumed until the next data containing word is encountered. With proper programming of the system, a continuous flow of data to the output may be achieved at the same time that various intrasystem functions are being carried out.

Figure 2:
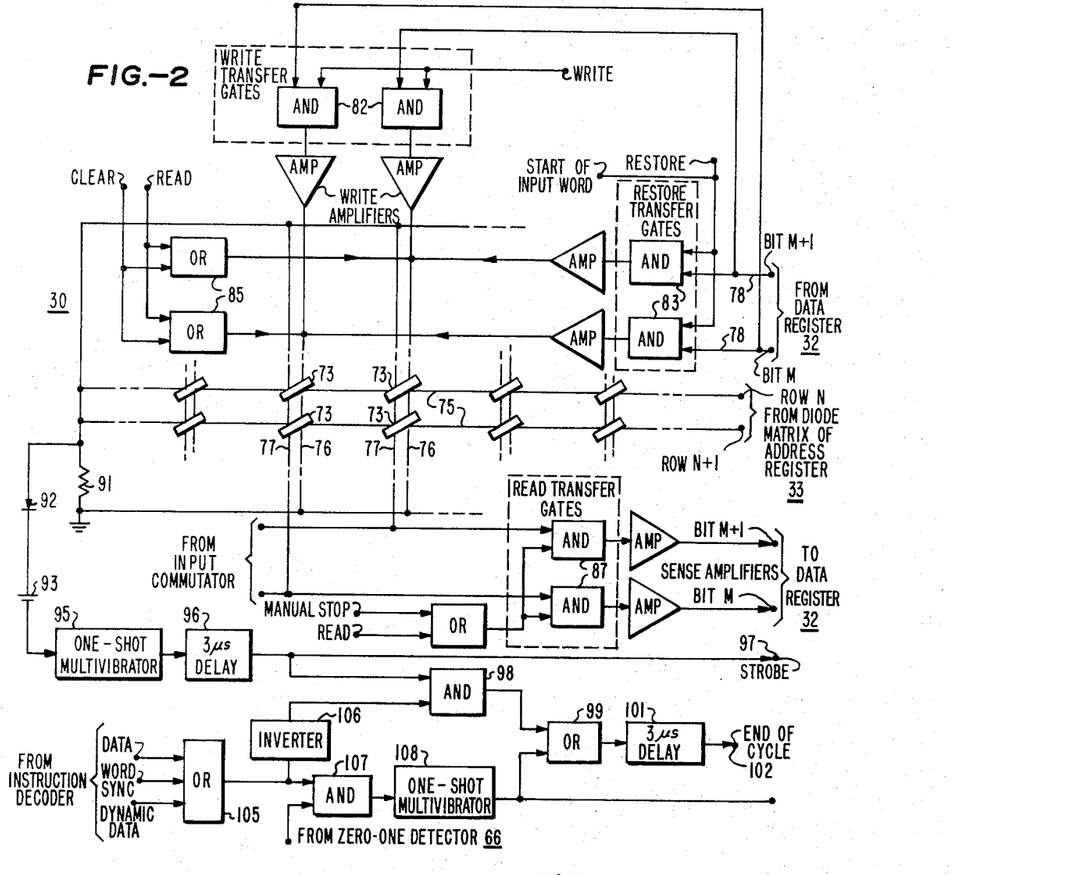
FIG. 2 is a detailed circuit diagram partially in block diagram form illustrating a portion of a magnetic core memory, such as may be employed in a data simulator in accordance with this invention, as illustrated in FIG. 1.

Referring now to FIG. 2, there is shown a typical magnetic core memory 30 containing a number of magnetic cores 73, each having an annular shape and rectangular hysteresis loop properties permitting the storage of a single bit of binary information. The cores 73 are arranged in word rows and bit columns to provide the 20 x 256 core matrix, that is, two hundred fifty-six word rows with twenty bits per word. Each core 73 is intersected by a row wire 75 and bit wire 76 for coincident current actuation, which means that a magnetic core 73 is only capable of being changed from one magnetic state to the other when pulses of a given polarity are passed simultaneously in the same direction through the core 73 on both its associated row and bit wires 75 and 76. Each bit column of cores 73 is also provided with a separate sensing wire 77, which has a pulse induced therein if a core in the column is switched from one magnetic direction to the other.

In operation, a particular word row N, as determined by the number contained in the address register 33, receives a current on its row wire 75, which is by itself insufficient in amplitude to switch one of the magnetic cores 73 from one magnetic position to the other. Assuming that a word has been stored in different bit positions of the data register 32, a signal is applied from each bit in the data register to separate bit leads 78 which acts to either enable or disable any associated AND gate to which it is connected, depending upon whether the particular bit represents a binary "one" or a binary "zero." For illustrative purposes, it will be assumed that the AND gates shown herein will be enabled only if the particular bit represented is a binary "one."

A first group of write transfer AND gates 82, one for each separate bit, are connected to be enabled in accordance with the binary bits contained in the data register 32. If enabled an AND gate 82 can pass a WRITE pulse which is applied to all of the gates 82 simultaneously, whereas those not enabled do not pass the applied WRITE pulse. The outputs of the AND gates 82 are connected through writing amplifiers to the respective bit line 76 thereby producing a current pulse having an amplitude sufficient when passed through a core in conjunction with the row current, to cause one of the magnetic cores 73 to switch to the binary "one" state. Therefore, the information from the data register 32 may be transferred in parallel via the separate bit transfer lines 78 and the WRITE transfer gates 82 to the individual cores 73 making up a particular word row in the memory. A similar arrangement of restore transfer gates 83 are connected in like fashion between the transfer line 78 and the bit lines 76, these gates 83 being responsive to pass a RESTORE pulse which is applied simultaneously to all to restore the information contained in the data register 32 to the address position it formerly occupied in the memory.

The information contained in the memory core 73 may be read out or cleared from a particular address by first actuating a chosen row line 75 with a current equal in amplitude but opposite in polarity to that used for inserting information, and then applying a coincident pulse to all of the bit lines 76 from a series of OR gates 85, which are responsive to either CLEAR or READ pulses obtained from the memory control unit 31. This results in the switching of the memory cores 73 which contain a binary "one" back to the "zero" state, which in turn induces a pulse on the associated bit sense line 77. The induced pulses may then be passed through associated read transfer gates 87 to be amplified and inserted in the appropriate bit positions in the data register 32. If the read transfer gates 87 are not enabled by a READ pulse being applied simultaneously thereto, then the induced pulses do not pass and the information is simply cleared from the system.

Inasmuch as the memory 30 and other elements of the system must be time synchronized with one another for proper operation, a basic timing circuit is included for generating timing pulses related to the memory operation. Since each memory operation begins with the application of a positive current pulse on one of the word row lines 75, the start of this pulse may be used as the reference point. For this purpose, a small resistor 91 is connected in the current path to produce a voltage indication of current being applied to one of the row lines 75. The voltage developed across the resistor 91 is then applied through a unidirectional device 92 and a differentiating capacitor 93 to the input of a one-shot multivibrator 95. The unidirectional device 92 prevents the passage of the negative polarity voltages developed during clearing or reading operations, so that pulses are applied through the differentiating capacitor 93 only at the beginning of a positive READ or CLEAR current pulse. The one-shot multivibrator 95 responds to the reference pulse and produces an output pulse of predetermined duration through a three microsecond delay circuit 96 to the strobe pulse output terminal 97. Therefore, the strobe pulses are timed to occur at approximately the middle of the six microsecond memory cycle.

The strobe pulse is also connected to the input of an AND gate 98, which unless disabled passes the pulse via an OR gate 99 through another three microsecond delay 101, thereby providing an end of cycle pulse at the terminal 102. The AND gate 98 is disabled only during those periods in which a data containing word is in the data register 32 awaiting transfer to the shift register 42. This condition occurs when the output from the instruction decoder indicating DATA, WORD SYNC, or DYNAMIC DATA words are applied through an OR gate 105 to be converted into a disabling signal by the inverter 106, the output of which is used to prevent the passage of the strobe pulse by the AND gate 98. However, the signal from the OR gate 105 is also applied to the input of another AND gate 107, which is enabled by a signal from the zero-one detector 66 to actuate a one-shot multivibrator 108, thereby providing a pulse through the OR gate 99 and the three microsecond delay 101 to the terminal 102 to act as an end of cycle pulse under these circumstances.

Figure 3:
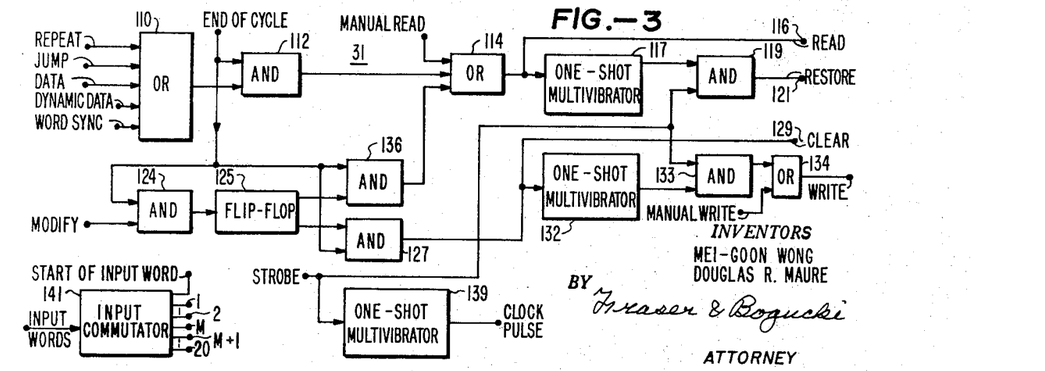
FIG. 3 is a detailed circuit diagram in block diagram form of the memory control unit illustrated in FIG. 1.

Referring now to FIG. 3, the strobe and end of cycle pulses generated by the memory circuitry are employed within the circuitry of the memory control unit 31 to provide the READ, RESTORE, CLEAR, and WRITE pulses needed to control the operation of the memory 30 as well as clock pulses for synchronizing the operation of the data register 32. With the exception of the MODIFY instruction, the other instruction outputs from the instruction decoder are applied through an OR gate 110 to enable an AND gate 112 to pass an end of cycle pulse to an output OR gate 114 to a READ pulse output terminal 116. The READ pulse produced is also delivered through a one-shot multivibrator 117 to enable an additional AND gate 119 which passes the slightly delayed STROBE pulse to a restore output terminal 121, that is, unless the AND gate 119 has been disabled by an output from the inverter 106 as above described.

The MODIFY instruction, on the other hand, is the only instruction requiring a clearing and writing operation not required with any of the other instructions. Accordingly, the MODIFY output from the instruction decoder is used to enable an AND gate 124, which delivers an end of cycle pulse to a flip-flop circuit 125, switching it to a first state to enable another AND gate 127, which may then pass the end of cycle pulse to a CLEAR output terminal 129. The CLEAR pulse is also used to actuate another one-shot multivibrator 132 which enables an AND gate 133 to pass a strobe pulse through an output OR gate 134 to a write output terminal 136. The CLEAR pulse, when applied to one of the word row lines 75, generates another set of strobe and end of cycle pulses, this next end of cycle pulse being passed through the enabled AND gate 124 to switch the flip-flop 125 to its other state. This enables another AND gate 136 to pass this end of cycle pulse through the output OR gate 114, thus generating the normal READ and RESTORE pulses for the continuation of the memory operation.

Voltages may also be applied in a continuous manner through the output OR gates 114 and 134 by closing the manual read and manual write switches 137 and 138, respectively, shown in FIG. 1. The manual switches 137 and 138 provide the operator control necessary for the insertion of words into the memory. The stobe pulses produced in the core memory 30 are also applied through a one-shot multivibrator 139 to produce "clock" pulses between a strobe pulse and the end of cycle that are useful in synchronizing the operation of the various transfer gates, as will hereinafter be explained more thoroughly.

Also contained within the memory control unit 31 is an input commutator 141 through which the input words may be fed to the data register 32, and thence transferred to the memory 30. The input commutator 141 is conventional and may be constructed to contain circuitry for recognizing the occurrence of the separate bits of information contained in the input words, so that each bit may be applied to a corresponding one of the output lines. After each input word is completed and before a new word starts, a "start of input word" signal may be generated from the commutator 141. This permits the automatic application of the different bits of the input word through their respective read transfer gates 87 to the correct bit positions in the data register 32, where they are later read out in parallel to the appropriate address in the memory 30. The "start of input word" signal from the input commutator 141 then advances the count in the address register 33 by a single count so that the following input word may be inserted in the succeeding address position.

Figure 4:
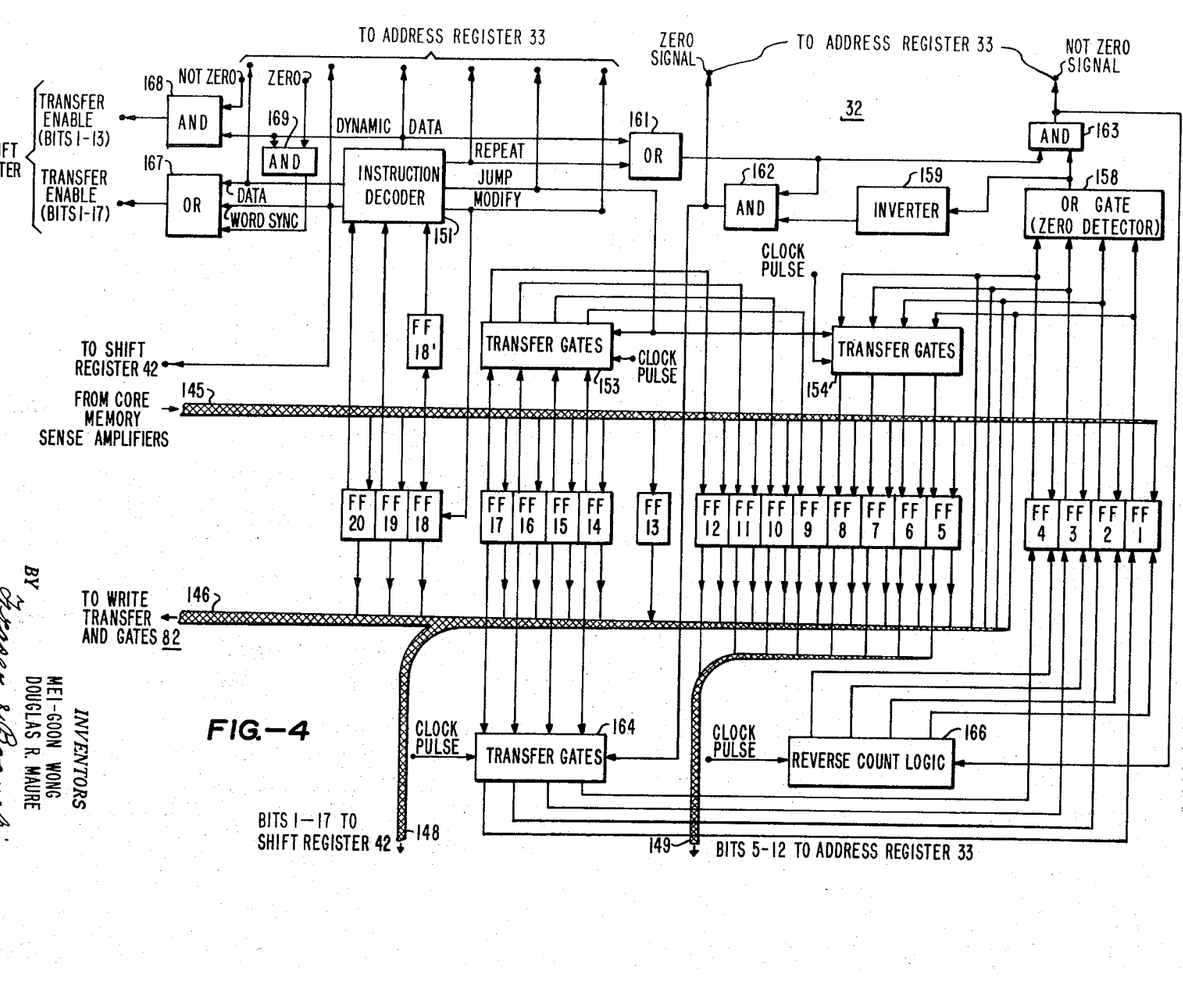
FIG. 4 is a detailed block diagram illustration of an input/output or data register of the data simulator illustrated in FIG. 1.

Referring now to FIG. 4, the data register unit 32 includes twenty active flip-flop stages FF1–20 for storing the separate bits of a word as the bits are applied through the read transfer AND gates 87 and the associated sense amplifiers either in parallel from the reading of a word contained in the memory or in series from the input commutator. For simplicity of illustration, the separate lines from each of the twenty different sense amplifiers have been shown combined into a single cable 145 from which input connections have been made to each of the flip-flops FF1–20. Different output lines from the flip-flops FF1–20 have also been shown as being combined in cable arrangements to effect transfer of selected bits of the word contained in the data register 32 to other points in the system. A first cable 146 connects the binary output of each of the flip-flops FF1–20 to the inputs of the write transfer AND gates 82, thereby permitting the word contained in the data register 32 to be written in or restored to a particular address location in the memory 30. Another output cable 148 is provided to transfer the bits 1–17 of the word contained in the data register 32 to the shift register 42 to be employed therein in producing the desired code output to the output control 49.

Yet another cable 149 allows the bits 5–12 of the contained word to be transferred to the address register 33.

During the time of automatic operation of the system, words read out of the memory 30 are inserted in parallel through the cable 145 to the flip-flops FF1–20. Outputs from the three flip-flops FF18–20, which may be used to register the bits in a word containing the instruction code, are connected to an instruction decoder 151 for interrogation. Instruction decoder 151 may be a conventional diode matrix, such as commonly used for binary decoding, so that outputs may be provided identifying the word instruction. For reasons which will become apparent hereinafter in connection with the more detailed explanation of the operations carried out by each of the instructions, the flip-flop stage FF18' provides one of the inputs to the instruction decoder 151. This permits the use of the MODIFY instruction to change the state of the flip-flop FF18 from a MODIFY to a JUMP instruction in the data register 32 without effecting a similar change in the input to the instruction decoder 151. In this way, the original word which contained the MODIFY instruction may be written back into the memory with a JUMP instruction without changing the MODIFY output from the instruction decoder 151.

A pair of transfer gates 153 and 154 are responsive to the JUMP output applied from the instruction decoder 151 to transfer the bits in the register flip-flops FF14–17 to FF9–12 and the bits in the flip-flops FF1–4 to FF5–8 upon occurrence of a clock pulse. As more fully explained hereinafter, these transfer gates 153 and 154 provide the means by which the word originally introduced into the data register 32 can be modified in accordance with these instructions. Outputs from the flip-flops FF1–4 are also connected through an OR gate 158, which provides a pulse at its output indicating that the binary number contained in these bit positions is not zero. By connecting the output of the OR gate 158 through an inverter 159, an output indicating the zero condition is also obtained.

The DYNAMIC DATA and REPEAT outputs from the instruction decoder 151 are combined through another OR gate 161 to provide an enabling signal for two AND gates 162 and 163, so that when the enabled AND gate 162 receives an output from the inverter 159 indicating that the number in FF1–4 is zero, then a "zero" signal is applied to a set of transfer gates 164, which respond to the next clock pulse to transfer bits contained in FF14–17 to FF1–4. On the other hand, the AND gate 163 receiving the not zero indication directly from the OR gate 158 provides a "not zero" signal to enable a reverse count logic circuit 166, which acts to reduce the binary count contained in FF1–4 by a single binary count each time a clock pulse is received.

Figures 5, 8:
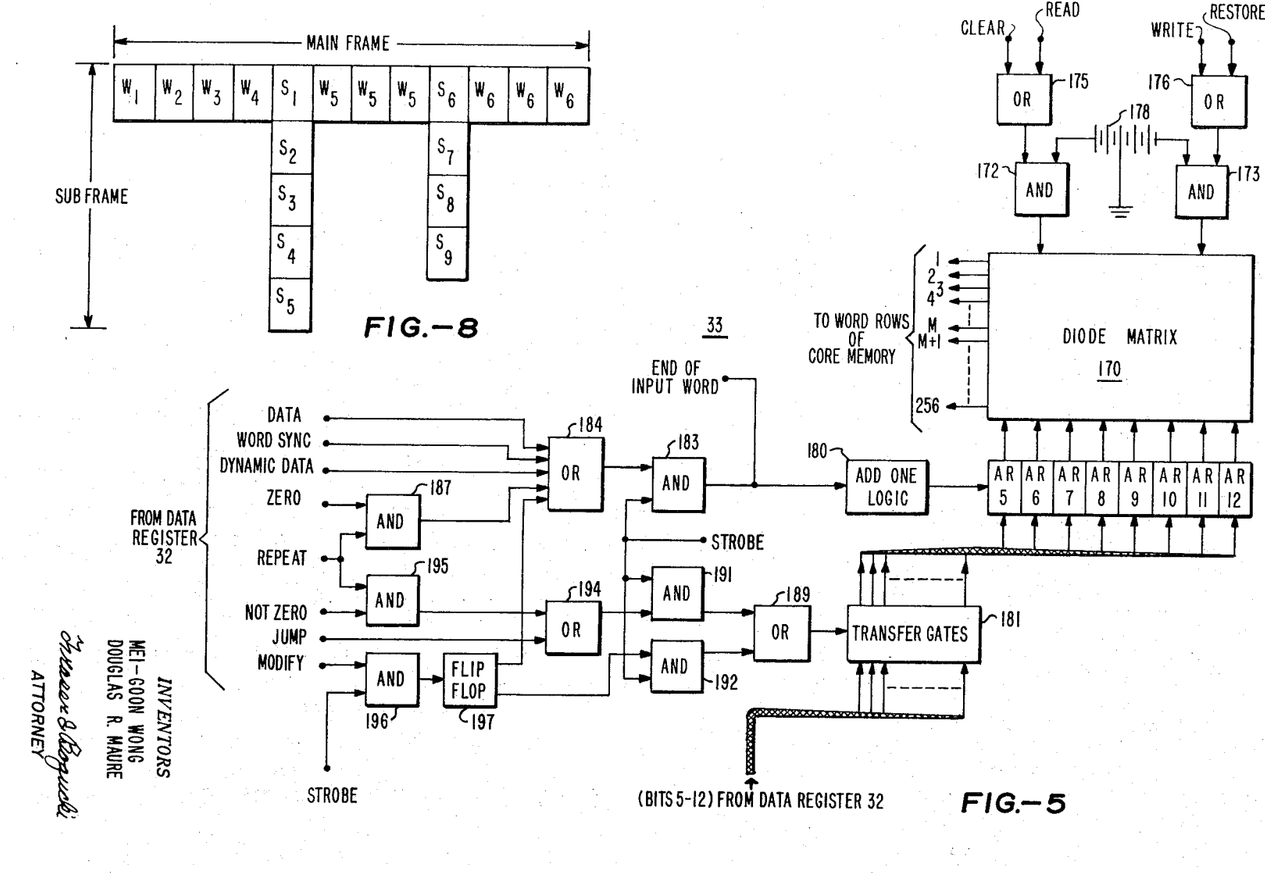
FIG. 5 illustrates in block diagram form the circuitry employed in the address register of the data simulator of FIG. 1.
FIG. 8 is a diagrammatic illustration of a subcommutated special word, such as may be produced with the system in accordance with the invention.

Referring now to FIG. 5, the address register consists essentially of eight flip-flop stages AR5–12 for holding the eight binary bits necessary to indicate a particular one of the two hundred fifty-six address positions in the memory 30. A conventional diode matrix 170 is connected to the output of each of the flip-flop stages AR5–12 to actuate the correct row wire 75 in the memory. One of the AND gates 172 and 173 may then be enabled by CLEAR or READ pulses through an OR gate 175 or by WRITE and RESTORE pulses through an OR gate 176, respectively, to pass current of the correct polarity to the enabled word row wire 75 from a power source 178.

At the end of a memory cycle, the count in the address register stages AR5–12 may be changed either by actuating an add one logic circuit 180, which increases the binary count by one to actuate the next address in the sequence, or by enabling the transfer gates 181 to insert a completely new address contained in the stages FF5–12 of the data register 32. The method employed depends upon the instruction then contained in the data register 32 and in some cases on the "zero" and "not zero" signals generated in the data register 32, as aforementioned.

The add one logic circuit 180 is actuated by strobe pulses delivered through an enabled AND gate 183 or, if words are being inserted, by the end of input word signal from the input commutator 141 in the memory control unit 31. DATA, WORD SYNC and DYNAMIC DATA instructions provide the enabling signals for the AND gate 183 directly through an OR gate 184. The OR gate 184 also receives an input from the output of an AND gate 187, which produces enabling outputs for REPEAT instructions only when a "zero" signal from the data register 32 is also present.

The enabling signals for the transfer gates 181 are strobe pulses applied through an OR gate 189 from a pair of AND gates 191 and 192. The AND gate 191 is enabled to pass a stobe pulse only when a signal is received through the OR gate 194 due either to the direct application of a JUMP instruction or to an output from an AND gate 195, which is responsive to the REPEAT instruction together with a "not zero" signal. The AND gate 192, on the other hand, is enabled when a MODIFY instruction first enables an AND gate 196 to pass a strobe pulse to switch a flip-flop 197 to a first state. The next strobe pulse is then applied through AND gate 196 to switch the flip-flop 197 to its opposite state, in which the AND gate 192 is disabled and the AND gate 183 enabled by this signal from the flip-flop 197 being applied through OR gate 184, thus passing a strobe pulse to actuate the add one logic circuit 180.

Figure 6:
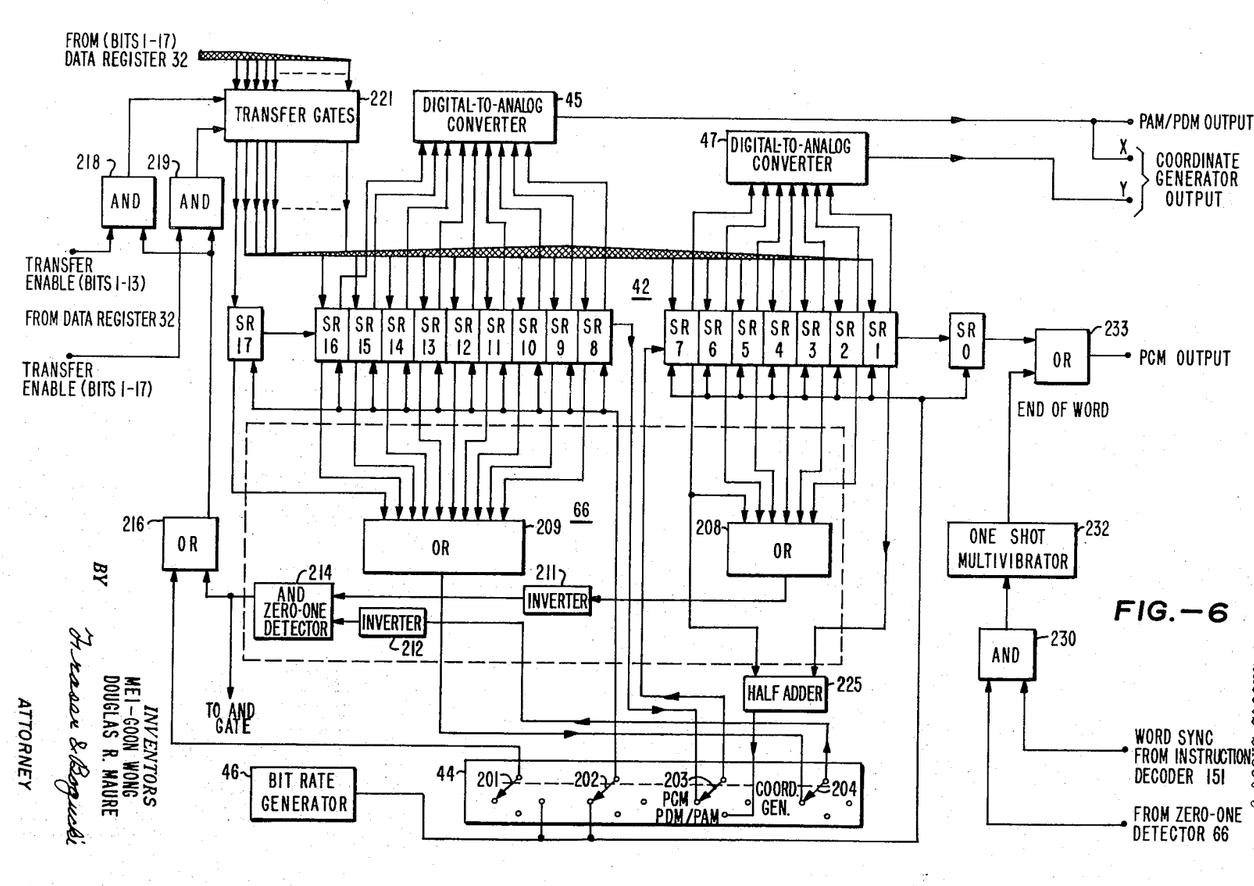
FIG. 6 is a block diagram illustration of a shift register along with the format selector shown in FIG. 1.

Referring now to FIG. 6, the shift register unit contains seventeen flip-flop stages SR1–17 connected in shift register fashion for receiving data bits from the data register 32. An additional flip-flop stage SR0 is interconnected in shift register fashion to the final stage SR1 to act as a one-bit delay for the pulses being shifted out in the PCM mode of operation.

The mode of operation of the shift register 42 may be selected by moving the four ganged selector switches 201, 202, 203 and 204 in the selector switch 44 to one of the three mode select positions. In the PCM mode, shift pulses are provided at a selectable frequency from the bit rate generator 46 through the select switch 202 to a first grouping of shift register stages SR8–17 while also being provided to the other shift register stages SR0–7 through a direct connection from the bit rate generator 46. The bits shifted out in sequence from the last stage SR8 of the first grouping are connected to the first stage SR7 of the second group through the select switch 203, so that the bits are shifted smoothly in sequence to the last stage.

A data word transferred to the shift register may be composed of any bit sequence equal to or less than sixteen bits followed by a binary one in the next higher numbered shift register stage with all zeroes in the remaining stages. Thus, as the last bit of the word has been shifted from the stage SR1 to SR0, the shift register contains a binary one in the SR1 stage followed by all zeros, thereby signaling the end of that data word. This condition is sensed by the OR gate 208 connected to receive outputs from all but the last stage SR1 and another OR gate 209 connected to receive outputs from all of the stages of the second group SR8–17. The outputs from the OR gates 208 and 209 are both applied through inverters 211 and 212, respectively, to an AND gate 214, which provide an output signal from the zero-one detector unit 66 only when no output signal occurs from the OR gates 208 and 209. An output signal from the zero-one detector 66 indicates that the shift register 42 is now ready for another data word to be inserted therein from the data register 32. Accordingly, the output from the AND gate 214 is applied through an OR gate 216 to enable a pair of AND gates 218 and 219, which pass the transfer enable outputs from the data register 32 to actuate the transfer gates 221. The output from AND gate 219 actuates the transfer AND gate 221 to pass the bits 1–17 in accordance with a transfer enable pulse being received from the OR gate 167, FIG. 4, whereas the transfer pulse passed through the AND gate 218 passes only bits 1–13 in accordance with a transfer enable pulse from an AND gate 168 in the data register 32. In addition to the DATA and WORD SYNC outputs, which are applied directly, a DYNAMIC DATA output provides a transfer enable output from the OR gate 167 only when combined with a "zero" signal at the input of an AND gate 169. Otherwise, a DYNAMIC DATA output from the instruction decoder 151 is combined with the "not zero" signal as inputs to an AND gate 168 to produce a transfer enable output for the bits 1–13 only.

The zero one detector 66 therefore operates to provide the code simulator with the unique capability of generating PCM words of variable bit length by simply coding the remaining bits in the data word in the prescribed manner.

In the PAM or PDM modes of operation, the ganged switches 201–204 are moved to the center position in which the second group of stages SR8–17 no longer receive the shifting pulses from the bit rate generator 206 through the switch connection 202. Also, the output from stage SR8 is disconnected from the input to stage SR7, which instead receives the output from a half-adder circuit 225. The inputs to the half-adder 225 are derived from the stages SR1 and SR7, and permit the use of this section of the shift register as a counter to maintain an output level for a given number of bit pulses before a new word is inserted into the shift register 42.

The final select switch 204, when moved to its center position, disconnects the output of the OR gate 209 from the inverter 212 and applies thereto a continuous lack of signal, which results in inverter 212 supplying a continuous enabling signal to the AND gate 214. In this condition, the output from the zero-one detector 66 is solely dependent upon a zero-one state occurring in the stages SR1–7. By properly choosing the code inserted into the stages SR1–7, a predetermined number of from one to one hundred twenty-eight shift pulses from the bit rate generator 206 would be required before the shift register count reaches the zero-one condition to signal the transfer of more data from the data register 32.

The binary number contained in the stages SR8–16 is connected to a conventional digital-to-analog converter 45, such as a resistor matrix, to produce an analog voltage output representative of the binary number registered in these stages. This analog voltage may then be employed in the output control circuit 49 to control the level of an output pulse whereas the counter action of the first seven stages SR1–7 may be used to control its duration. If desired, fine control of pulse duration may be accomplished by varying the frequency of the bit rate generator 46. With the system operating in the PAM mode, the timing code to the counter stages SR1–7 remains constant whereas the binary number to the stages SR8–16 is varied to produce the desired amplitude modulation of the constant width pulses. On the other hand, where PDM mode of operation is desired, the binary number to stages SR8–16 is maintained constant whereas the timing code to SR1–7 is varied to obtain the desired pulse duration variations.

Finally, in the coordinate generator mode the ganged switches 201–204 are moved to the last position in which the switch 201 connects pulses from the bit rate generator 206 directly through the OR gate 216 to enable both AND gates 218 and 219. This results in the transfer enable outputs from the data register 32 being delivered to the transfer gate 221 once for each pulse from the bit rate generator 206 to thereby insert entirely new data to the shift register 42. The bits contained in the shift register stages SR1–7 are connected to another digital-to-analog converter 47, which together with the digital-to-analog converter 45, provides the two analog voltages representing the two coordinate values. The coordinate values generated may be varied each time a pulse is received from the bit rate generator 206, at which time new data from the data register 32 is transferred into the shift register stages SR1–17.

In many telemetry systems, it is a common practice to transmit words or data sequences in the PCM mode containing a distinctive pulse for either identifying the separation between words or for synchronizing the receiving system with the incoming pulse train. Such a pulse may be generated in the present system through use of the WORD SYNC instruction from the decoder 151, which is used to enable an AND gate 230. The output from the zero-one detector 66 can then be passed through the AND gate 230 to actuate a one-shot multivibrator 232 to provide a distinctive pulse through an OR gate 233 at the end of each word.

The operation of the entire checkout system can best be understood by reference to the content of and the functions performed by the different instructions. Referring now to FIG. 7, there is illustrated in graphical form with appropriate legends the contents of the six basic instructions used within the checkout system. Each word contains twenty separate bits with the bits 18–20 containing a binary number indicative of the instruction to be carried out, and is shown as a separate bit group. The other bits in a word are grouped and bear a descriptive legend thereunder explaining the nature of the information contained therein.

Figure 7:
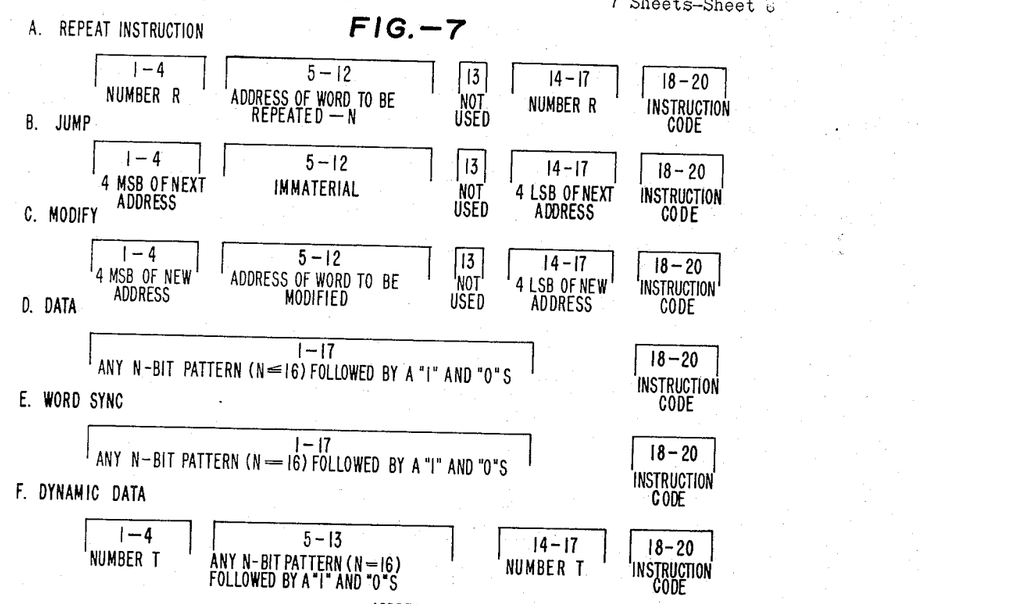
FIG. 7 is a diagrammatic illustration of the bit arrangement within the various data and instruction words employed with the data simulator system in accordance with this invention.

In particular, the word diagram A of FIG. 7 shows the makeup of a word containing a REPEAT instruction. The REPEAT instruction commands the memory to read out a particular data word stored in a given address R number of times, R being less than or equal to sixteen. Both bit groups 1–4 and 14–17 contain a binary number equal to R at the time that the word is first read out from the memory 30 to the data register 32. The address N of the word to be repeated is contained in the bit group 5–12, and the bit 13 is the only one of the twenty bits which is not used. Upon recognition of the REPEAT instruction by the instruction decoder 151, an enabling pulse is delivered to the AND gates 187 and 195 of the address register 33 and a similar pulse is delivered through the OR gate 161 to enable the AND gate 162. If the number R contained in the bit group 1–4 is not zero, as sensed by the OR gate 158 of the data register 32, then an output signal is delivered from the AND gate 163 to the reverse count logic circuit 166 to cause a binary "one" to be subtracted from the number then contained in the bit group 1–4, and the entire word is then restored in its original address position in the memory 30. The "not zero" signal also produces an output from the enabled AND gate 195 which allows the AND gate 191 to pass a strobe pulse to the transfer gates 181 to thereby transfer the bit group 5–12 to the address register stages AR5–12. Upon the occurrence of the next READ pulse, the information at the address N will be read out to the data register 32.

If on the other hand, the number in the bit group 1–4 is zero, as happens when the original number R has been reduced to zero by subtracting a binary "one" R number of times, an output signal from the AND gate 162 enables the transfer gates 164 to transfer the bit group 14–17 to the bit group 1–4 to thereby restore the original number R in that position. The "zero" output is also passed through the AND gate 187 to enable AND gate 183 to pass a strobe pulse to the add one logic 180, thereby advancing the count in the address register stages AR5–12 to read out the next word.

It should be noted that a multiplication effect may be produced by including another REPEAT instruction in the next word position. For example, a REPEAT instruction calling for the preceding data word to be repeated ten times may be followed by a second REPEAT instruction calling for the first REPEAT instruction to be repeated five times, thus repeating the data word fifty times in all.

The JUMP instruction shown in word diagram B provides random access to any cell of the memory. When a word containing a JUMP instruction is placed in the data register 32, an output is provided by the instruction decoder 151 through an OR gate 156 to both of the transfer gates 153 and 154. The transfer gate 153 opens to transfer the binary bits contained in FF14–17 to FF9–12, whereas transfer gate 154 opens to transfer bits from FF1–4 to FF5–8. The bit group 1–4 contains the four most significant bits of the next address number, while the bit group 14–17 contains the four least significant bits of this next address so that, after the transfer operation, a complete new address is contained in the bit group 5–12. The JUMP instruction output also acts through the logical circuitry contained in the address register 3 3to open the transfer gates 181 with a strobe pulse to transfer the newly constituted bits 5–12 to the address register. The next READ pulse is then applied to the memory 30 to read out the next word from the address indicated.

The MODIFY instruction shown in word diagram C of FIG. 7 is always used in conjunction with the JUMP instruction and is similarly constituted. The bit group 1–4 contains the four most significant bits of the new address and bits 14–17 contain the four least significant bits. The bit group 5–12 contains the address of the word to be modified, which is immediately transferred through the transfer gate 181 to the address register 33. In this case, enabling of the transfer gate 181 is accomplished by means of a clock pulse delivered through an AND gate 192, which has been enabled by the MODIFY output from the instruction decoder 151. The MODIFY instruction output is also coupled to change the binary state of FF18 to thereby change the instruction of the word in the data register 32 from a MODIFY to a JUMP instruction. However, the state of FF18' is not changed so that the output from the instruction decoder 151 remains the same. The MODIFY instruction is also applied through the logical circuitry within the memory control unit 31 to develop a CLEAR pulse in conjunction with the next end of cycle pulse by using the MODIFY output to enable the AND gate 124, thereby causing the flip-flop 125 to assume a first state to allow an end of cycle pulse to be delivered through the AND gate 127. The CLEAR operation in the memory 30 results from the CLEAR pulse being applied through the OR gates 85 to read out the information contained in the core 73 of the selected address word row while maintaining the read transfer gates 87 disabled. Then a strobe pulse is used to generate a WRITE pulse from the AND gate 133 so that the word contained in the data register 32 can be read into the selected address in the memory. As previously explained, the next end of cycle pulse causes the flip-flop 125 to change to its other state so that a read pulse will be delivered from the AND gate 136 to read out the next word. Thus, the MODIFY instruction is seen to require two full memory cycles, one a read/restore cycle and the other clear/write cycle, to complete the system operation called for by the instruction.

The MODIFY instruction output from the decoder 151 is also applied to the logic circuitry in the address register 33 to perform a similar two cycle operation. In this case, the MODIFY instruction enables an AND gate 196, which then provide a strobe pulse to a flip-flop 197 to switch it to a first state. In this state, the output of the flip-flop 197 enables another AND gate 192 to pass a strobe pulse through the OR gate 189 to open the transfer gates 181, thereby causing the bits 5–12 to be transferred from the data register into the address register stages AR5–12. Upon the occurrence at the second strobe pulse during the presence of the MODIFY instruction, the flip-flop 197 is switched to its other state, thus disabling the AND gate 192 and delivering a pulse through the OR gate 184 so that a strobe pulse may pass through the enabled AND gate 183 to actuate the add-one logic circuit 180. Thus after the clear/write cycle has been completed at the address designated, the count in the address register stages AR5–12 is advanced by a binary "one" so that the next word address may be read out.

The DATA instruction merely specifies that the bits 1–17 are to be transferred from the data register 32 to the shift register 42 when commanded by the zero-one detector 66. As shown in word diagram D, the bits 1–17 of a DATA word may contain any bit pattern less than sixteen bits long follwd by a binary one and all zeros. The DATA output from the instruction decoder 151 is applied through an OR gate to generate a transfer enable signal, which is then applied to enable the AND gate 219 in the shift register. When an output is generated by the zero-one detector 66, the output from the AND gate 219 opens all of the transfer gates 221 to pass the bits 1–17. Also the DATA output is applied through an OR gate 105 and inverter 106 to disable the AND gate 98 so that the end of cycle pulse will not be generated until such time as an output is received from the zero-one detector 66, which at that time will pass through the enabled AND gate 107 to actuate the one-shot multivibrator 108 to generate the end of cycle pulse. Further, the DATA output acts directly through the OR gate 184 and the AND gate 183 to pass a strobe pulse to actuate the add-one logic 180, so that the address count in the address register stages AR5–12 is advanced to the next position for the following READ pulse.

The WORD SYNC instruction shown in word diagram E performs exactly the same functions as the DATA instruction, but in addition is applied to enable the AND gate 230, which passes the output from the zero-one detector 66 to actuate the one-shot multivibrator 232, thereby producing an end of word pulse of distinctive characteristic.

The DYNAMIC DATA word, as shown in word diagram F, is used to generate a changing big pattern from a single data word for each commutation cycle which includes that word. The DYNAMIC DATA output from the instruction decoder 151 is applied through the OR gate 161 in the same manner as a REPEAT instruction to permit use of OR gate 158 to act as a zero detector for the bit pattern contained in FF1–4. If the bits 1–4 are not zero, a clock pulse will actuate the reverse count logic circuit 166 to subtract a binary "one" from the binary count in FF1–4, and a RESTORE pulse will be generated in the normal manner. The DYNAMIC DATA output is also used as a transfer enable signal to open the transfer gates 221 for the bits 1–13 contained in the data register 32 so that they are transferred into the shift register 42 upon occurrence of an output from the zero-one detector 66.

If, on the other hand, the binary count in FF1–4 has reached zero, the "zero" signal actuates the transfer gate 164 to transfer the bits contained in FF14–17, which is the original number T that was contained in FF1–4, to FF1–4. The word, now changed back to its original form, is restored to its original position in the memory 30. The DYNAMIC DATA output is also supplied to the input of the OR gate 184 so that the add one logic circuit 180 will be actuated to advance the count contained in the address register to the next position. Thus, the binary bits 1–13 of the word are transferred to the shift register 42 T number of times, with the data bits 5–13 remaining the same but the data bits 1–4 being reduced by a binary "one" on each successive cycle to provide a changing bit pattern in these four bit positions. However, when the binary count in FF1–4 reaches zero, the "zero" signal is applied to an AND gate 169 already enabled by the DYNAMIC DATA output to generate a transfer enable pulse for the bits 1–17, thereby transferring the entire seventeen bits of the word into the shift register 42 on the last count.

Referring now to FIG. 8, there is shown in graphical form an example of a special word output, such as may be generated by the system using its commutative capability. The special word illustrated consists of a repetitive main frame ten memory word cycles long with a pair of subframes S1–5 and S6–9 of unequal length which appear in the fifth and ninth word positions in the main frame. Thus each time the main frame is repeated, the next word in the subframes is inserted into the fifth and ninth positions in commutative fashion. The sixth through ninth positions of the main frame consist of the same word $W_5$ repeated three times, whereas the seventh through tenth positions are the same word $W_6$ repeated.

Figure 9:
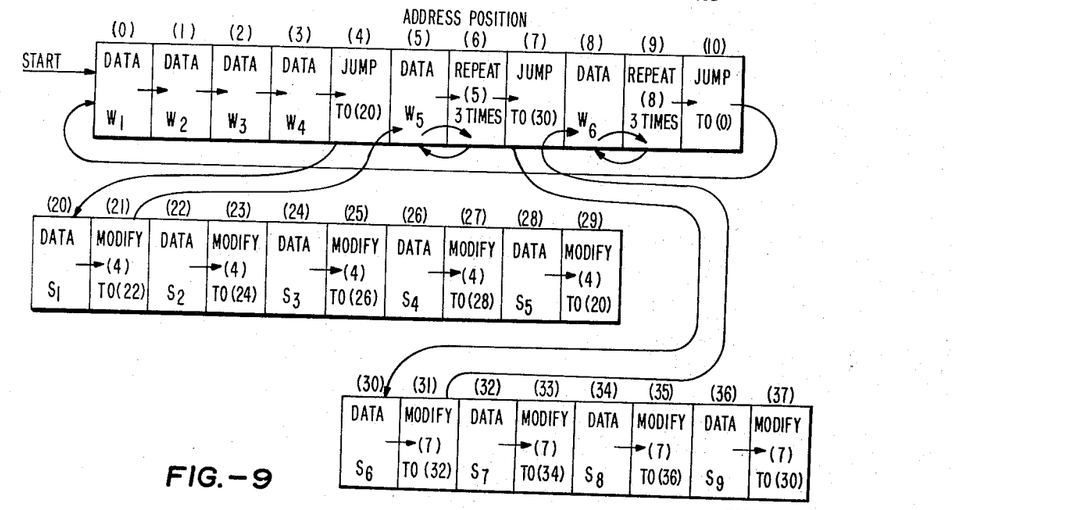
FIG. 9 is a functional diagram showing the contents at different address positions within the memory along with the functions performed in generating the special word sequence shown in FIG. 8.

The manner in which words are inserted into the address positions of the memory 30 to produce a special word, such as shown in FIG. 8, is illustrated in the functional diagram of FIG. 9. The different address positions are illustrated with the contents of the word included therein, and the operation of the memory in advancing from one address position to the next is illustrated by means of directional lines. Upon receipt of a starting signal, the first DATA word $W_1$ contained in the address position 0 is read out from the memory 30 through the data register 32 to be shifted out from the shift register 42. After the DATA word $W_1$ has been shifted out, the system advances to the next address position 1 to read out the DATA word $W_2$, and thence in like fashion to the address positions 2 and 3 to obtain the DATA words $W_3$ and $W_4$ respectively. After the word $W_4$ has been shifted out, the system advances to the address position 4, which contains a JUMP instruction word commanding the system to jump to the address position 20 and read out the word found there. The address position 20 contains the DATA word $S_1$ of the first subframe, which is then read out to the output. The system then advances to the next address position 21 where a MODIFY instruction is contained to command the memory to change the word contained in the address position 4 from JUMP to 20 to JUMP to 22, so that on the next repetition of the main frame the DATA word $S_2$ in address position 22 will be read out.

Next, a binary one is added to the address position 4 contained in the address register 33 and the DATA word $W_5$ contained in address position 5 is read out. The system then advances to the address position 6, where a REPEAT instruction commands the system to repeat the DATA word $W_5$ contained in the address position 5 three times; after which the system advances to the address position 7. The JUMP instruction contained in address position 7 commands the system to move to the address position 30, in which is contained the first DATA word $S_6$ of the second subframe. The system then advances to the address position 31 wherein a MODIFY instruction is contained which first changes the JUMP instruction in address position 7 to command a jump to position 32 upon the next repetition of the main frame. The system advances to the next address position 8 containing the DATA word $W_6$ and then to the REPEAT instruction in the address position 9, which commands the system to repeat the DATA word $W_6$ in position 8 three times. A JUMP instruction contained in the last main frame address position 10 then commands the system to jump back to the address position 0 to repeat the main frame sequence again. This time the subframe words $S_2$ and $S_7$ will be read out, and the JUMP instruction in the address positions 4 and 7 modified to continue the subframe sequence.

The WORD SYNC and DYNAMIC DATA instructions may likewise be employed at appropriate address positions to generate the specialized data words of which they are capable. From the simple illustration contained in FIGS. 8 and 9, it should be obvious to those skilled in the art that the system in accordance with the invention is capable of generating extremely long series of changeable bit patterns in a continuous manner and with great efficiency in utilizing memory capacity. For example, the above simplified illustration uses only twenty-nine address positions to generate a changeable bit pattern two hundred forty DATA word cycles in length before the pattern repeats itself.

Figure 10:
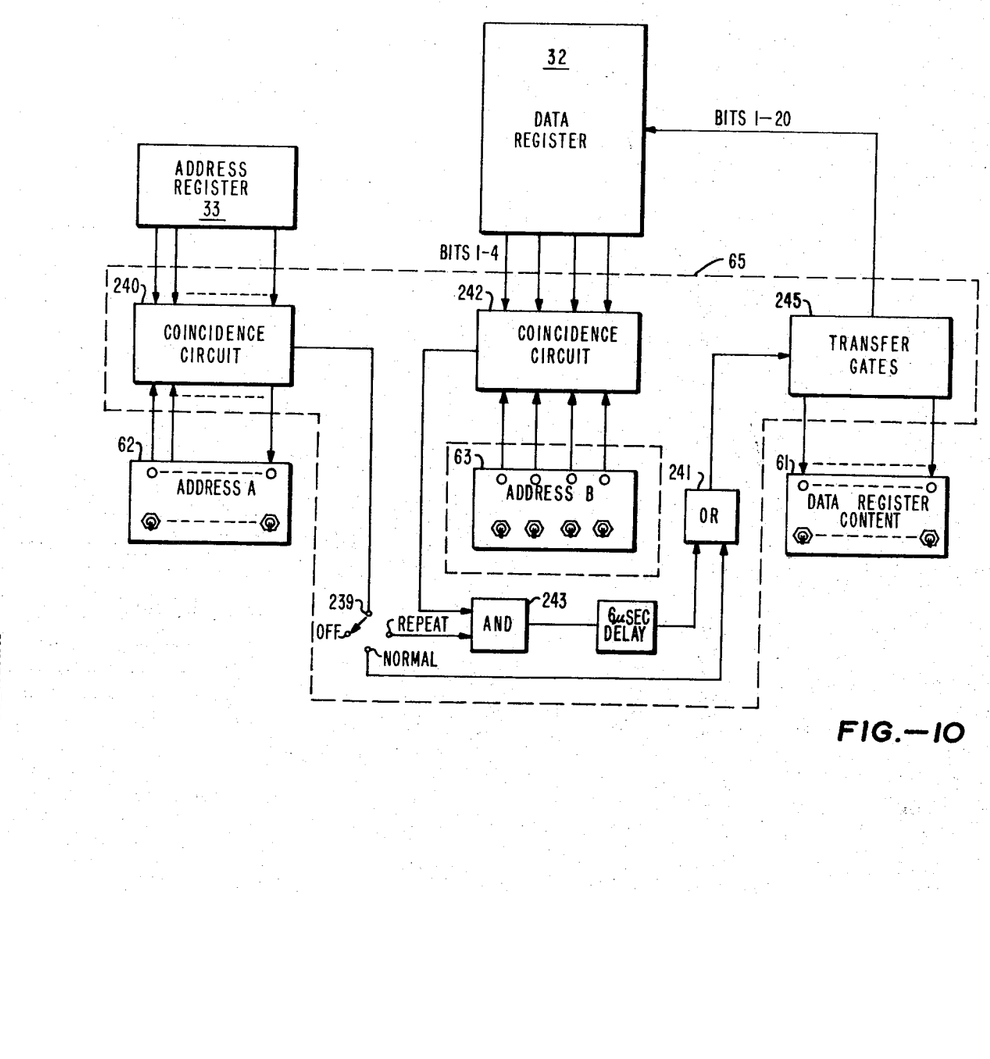
FIG. 10 is a detailed block diagram illustrating the special word circuit and its associated circuitry.

Referring now to FIG. 10, the special word circuit 65 is shown in detail interconnected with the address register 33, the data register 32 and the address panels 61, 62 and 63 to effect dynamic changes in the output data from the simulator. The desired word is first set in the bit positions of the address panel 61 by setting the toggle switches at each bit position. An address position is chosen by setting the toggle switches on the address A panel 62, and a three position switch 239 is moved from its OFF position to its NORMAL position. A coincidence circuit 240 is connected to compare the count in the address register 33 with the setting in the address A panel 62 so that when they agree an output will be delivered through the switch contact 239 and an OR gate 241 to enable the transfer gates 245. The transfer gates 245 operate to pass the bits of the desired word from the panel 61 to the stages of the data register 32 to replace the word normally read out at that address position. Subsequently, the desired word can be transferred from the data register 32 to the shift register to generate an output or be transferred in whole or in part elsewhere to change the data sequence.

If the word is to be inserted at a particular repetition count in a repeated sequence, the switch contact 239 is moved to the REPEAT position where the output signal from coincidence circuit 240 is used to enable an AND gate 243. The toggle switches in the address B panel are set to indicate the repetition count where the word is to be inserted. A coincidence circuit 242 compares the bits 1–4 in the data register 32 with those in the address B panel 63 and delivers an output signal when they are equal through the enabled AND gate 243 and a six microsecond delay. The delayed signal is then applied through OR gate 241 to open the transfer gates 245, thereby transferring the word from panel 61 into the data register 32 during the next cycle.

As will be recognized by those skilled in the art, the system of the present invention is capable of simulating any digital or analog code format regardless of complexity, and is capable of storing several formats simultaneously. Assuming that the commutation cycle shown in FIGS. 2 and 9 contained a PCM format, the system could be manually or automatically switched to a new address group wherein a different format is contained. With the versatility offered by this system, there is no practical limitation on the length of a special word or frame, the number of special words, or the number of channels it may be either supercommutated or subcommutated. This permits the system to be used to evaluate, checkout, and calibrate various decommutation systems, digital or video tape system, digital or analog computers, quick look devices, X–Y plotters, or telemetry data processing systems. By programming the system to produce the format containing static data words, the system may be used to measure the accumulated noise in the system being checked out since the amount of changing data detected at the output is a measure of this accumulated noise. On the other hand, when the system is programmed to produce a format containing changing data words so that the dynamic errors may be measured, the difference between the static and the dynamic errors can be used to measure the inability of the system to track a particular format.

Although there has been described a preferred embodiment of the invention, it will be understood that various changes, modifications and equivalent arrangements may be employed to adapt the invention for particular uses without departing from the invention as expressed in the appended claims.

What is claimed is:

1. A code format simulator system comprising:

memory means for storing word groups of information in the form of electrical pulses at different address positions, each word group containing electrical pulse information indicative of a word group type;

controllable means for reading out said word groups from a normal sequence of address positions;

means responsive to the pulse information indicative of the word group type for producing a signal identifying the type of word group which is read out;

control means responsive to a signal identifying certain types of word groups for altering said normal sequence in accordance with the electrical pulse information contained in the word read out; and output means including a register means for receiving other types of word groups read out in sequence from said memory means and for producing a continuous coded output signal modulated in accordance with the electrical pulse information contained in this other type of word group.

2. A code format simulator system comprising:

memory means for storing multibit binary words of different types of distinct address positions, each word containing instruction bits identifying the word type, the memory means including means for inserting and reading out a word at any selected address position;

a first binary bit register for temporarily storing the words to be inserted and the words having been read out of the memory, said register including means for interrogating said instruction bits and producing instruction signals indicative of the word type stored therein;

an address register for storing binary bits representative of any desired address position and producing an address signal to the memory means for selecting said desired address position;

a multistage shift register for producing a continuous coded output signal modulated in accordance with binary bits transferred thereto and shifted out in sequence;

first transfer means responsive to the instruction signal derived from a first word type for transferring selected binary bits within the word from said first binary bit register to said address register to change the address position stored therein;

second transfer means responsive to the instruction signal derived from a second word type, and including said first transfer means for transferring selected binary bits within a word from said first binary bit register to said address register to change the address position stored therein, and also for transferring the word from said first binary bit register to the new address position in said memory means indicated by the changed address position;

third transfer means responsive to the instruction signal derived from a third word type for transferring bits contained in the first binary bit register in parallel to the multistage shift register to be shifted out in series; and output means responsive to the bits shifted out of the shift register for providing a continuous modulated pulse signal in accordance with a preselected code format.

3. A system for producing pulse amplitude modulated and pulse duration modulated signals comprising:

a source of multibit binary words;

register means including first and second groups of binary stages for receiving the bits of a binary word;

transfer means responsive to a command signal for providing said binary words in a predetermined sequence from said source in parallel to the binary stages of said register means, each multibit binary word being composed of a first group of binary bits representative of a desired amplitude and a second group of binary bits representative of a desired pulse count;

converter means connected to the first group of stages of said register means receiving said first group of binary bits, for providing a voltage having an amplitude in accordance with the amplitude indicated by the binary bits of the first group;

a source of regularly occurring pulses;

means including the second group of stages of said register means receiving said second group of binary bits, for counting a number of pulses from said source equal to a predetermined number represented by the bits in said second group;

means responsive to the completion of the predetermined number of pulses for providing a command signal to the transfer means to transfer the next multibit binary word in the sequence; and output circuit means responsive to said voltage amplitude and to the predetermined number of pulses to provide output pulses having an amplitude proportional to the indicated amplitude and a duration proportional to the time period required to provide the predetermined number of pulses.

4. The system of claim 3 wherein:

said second group of stages are connected in shift register fashion to shift the binary bits contained therein from a first stage to a last stage of the first group in response to the regularly occurring pulses, and wherein said counting means further includes;

a half-adder circuit for receiving the binary bit values from the first and last stages of the second group and providing a half-adder logic output to the input of the first stage of said second group; and wherein said means for providing a command signal includes detector means responsive to the binary bits contained in said second group of stages for providing the command signal when the counting means has operated to produce a predetermined binary bit arrangement within said second group of stages.

5. A memory system for providing multibit binary data words in a variable sequence comprising:

means for storing multibit binary words of different types at distinct address positions, each word containing instruction bits identifying the word type;

means including an address register for inserting and reading out a word contained at an address position indicated by the binary bits contained in the address register;

a binary bit register for temporarily storing the words to be inserted into the memory and the words having been read out of the memory, including means for interrogating said instruction bits and producing instruction signals indicative of the word type;

an output means responsive to a first instruction signal indicative of a data word type for receiving the bits of the data word and providing an output signal indicative thereof;

first transfer means coupling selected bits in the binary bit register to other selected bits in the binary bit register and being responsive to a second instruction signal for thusly modifying the binary bits of the word stored in said bit register;

second transfer means coupling selected binary bits in the binary bit register to the address register for changing the indicated address position contained in the address register to another address position identified by a third instruction signal; and means responsive to instruction signals for normally advancing the indicated address position by a single count when said second transfer means is not operative.

6. A code format simulator system comprising:

memory means for storing word groups of information in the form of electrical pulses at different address positions, each word group containing electrical pulse information indicative of a word group type;

controllable means for normally reading out words from said word group types a preselected sequence of address positions;

means responsive to the electrical pulse information indicative of the word group type for producing a signal identifying the type of word group which is read out;

control means responsive to a signal identifying a first type of word group for altering said normal preselected reading sequence in accordance with the electrical pulse information contained in the words read out of said first type word group; and output means including a register means receiving words from a second word group type other than said first type as such words are read out in sequence from said memory means for producing a continuous coded output signal modulated in accordance with the electrical pulse information contained in this second type of word group.

7. A system for producing a continuously variable coded output signal comprising:

means for storing at assigned storage locations different word types wherein each word is made up of a plurality of binary bits with a unique bit portion thereof identifying the word type and another unique bit portion thereof representing the information content for the word, said different word types including data words and instruction words;

readout means connected to said storing means and controllable for reading out words from any storage location thereof, said readout means being normally sequenced to read out at least one or more data words followed by at least one instruction word;

word identifying means associated with said readout means for emitting a data output signal when a data word is read out from said storing means, and for emitting an instruction output signal when an instruction word is read out from said storing means;

modulating means connected to said readout means to receive said data words and responsive to a data output signal from said word identifying means for emitting a continuous coded output signal modulated in accordance with the information content of said data word; and means connected between said word identifying means and said readout means and responsive to said instruction output signal for controlling the readout sequence of said readout means in accordance with the information content of said instruction word.

8. A system in accordance with claim 7 wherein said modulating means is a pulse code modulator comprising:

a multistage shift register for storing the information content of a data word;

a series output terminal for said register; and a selectively variable source of shift pulses for shifting said information content to said output terminal as a series output signal which varies in accordance with the information content of said data word.

9. A system in accordance with claim 7 wherein said modulating means comprises:

a multistage shift register for storing the information content of a data word;

an output terminal for said shift register;

signal conversion means connected to said shift register for converting one specified portion of the information content therein to an analog signal form; and second signal conversion means connected to said shift register and responsive to another specified portion of the information content therein for controlling the duration of appearance of said analog signal at said output terminal.

10. A system in accordance with claim 7 wherein said modulating means is a multicoordinate output device comprising:

a multistage shift register for storing the information content of a data word; and at least two signal converters connected to said shift register for converting at least two specified portions of said information content to at least a pair of analog signals, with each analog signal having an amplitude indicative of a coordinate value determined by the binary content of the information portion from which it is derived.

11. A system in accordance with claim 7 wherein the instruction words contain instruction commands in said unique bit portion and additional instruction commands and storage location signals in said information content bit portion of said instruction words, and wherein said readout sequence controlling means comprises:

first signal decoding means for decoding the unique bit portion of said instruction words;

second signal decoding means for decoding the information content bit portion of said instruction words; and control means in said readout means responsive to said first and second decoding means when an instruction word is decoded thereby for altering said normal sequence for said readout means in accordance with said decoded instruction word.

12. A system in accordance with claim 11 wherein said control means comprises:

a first control circuit responsive to said first and second decoding means when a first instruction word is decoded thereby for repetitively reading from said storing means a designated data word a predetermined number of times as defined by said first instruction word.

13. A system in accordance with claim 11 wherein said control means further comprises:

a second control circuit responsive to said first and second decoding means when a second instruction word is decoded thereby for jumping to a storage location in said storing means other than a storage location normally sequenced for said readout means.

14. A system in accordance with claim 12 wherein said control means further comprises:

a third control circuit responsive to said first and second decoding means when a third instruction word is decoded thereby and also responsive to said second control circuit for modifying the information content of the word in said storing means at the jumped storage location.

15. A system in accordance with claim 11 wherein said control means comprises:

a fourth control circuit responsive to said first and second decoding means when a fourth instruction word is decoded thereby for repetitively modifying the bit patterns of a single data word.

16. A test signal generator for converting a finite number of multibit digital data words into a continuous test signal modulated to incorporate more information content than the information content of the finite number of multibit digital data words, said test generator comprising:

means for storing a finite plurality of multibit binary data words and an additional plurality of instruction words;

memory means normally operative for reading out words from the memory means in a predetermined sequence, which includes at least one data word and one instruction word, and selectively controllable for altering said reading sequence and for modifying the information content of said data words;

a multibit binary shift register for continually receiving in sequence the binary bits of sequential data words as said data words are provided thereto in said readout sequence;

a source of shift pulses for said register for shifting out in series the binary bits of data words received thereby;

means responsive to the binary value of the bits of sequential data words shifted out from said shift register for providing a continuously modulated test signal varying in accordance with the information content of said data words;

means operative during said shifting operation for receiving an instruction word read out from said memory during said shifting operation; and means connected between said instruction word recognition means and said memory means, and responsive to said instruction word for altering said predetermined readout sequence or for modifying the information content of selected ones of said finite data words.

17. A code format simulator system comprising:

a memory unit having means for storing multibit binary words of different types at distinct address positions, each word containing bits identifying the word type;

means for reading out a word contained at any selected address position;

an address register for storing binary bits representative of one of the address positions and producing an address signal to the memory unit for selecting an address position;

a first binary bit register for temporarily storing the words to be reinserted into the memory after the words have been read out of the memory;

means associated with said first bit register for interrogating said identifying bits and producing instruction signals indicative of the word type;

a second binary bit register for receiving from said first binary bit register a first type of binary words and for producing a continuous coded output signal modulated in accordance with the binary bits of the words received; and means coupled between said interrogating means and said address register and responsive to instruction signals indicative of a second word type for selectively changing the address signal in the register in accordance with the address position indicated by said second type word.

References Cited

UNITED STATES PATENTS

| | | | |
|---|---|---|---|
| 3,012,240 | 12/1961 | Klahn | 340—347 |
| 2,968,027 | 1/1961 | McDonnell et al. | 340—172.5 |
| 3,037,192 | 5/1962 | Everett | 340—172.5 |
| 3,061,192 | 10/1962 | Terzian | 340—172.5 X |
| 3,104,375 | 9/1963 | Wright | 340—172.5 |
| 3,154,770 | 10/1964 | Schwab et al. | 340—172.5 |
| 3,241,125 | 3/1966 | Tomasulo et al. | 340—172.5 |
| 3,256,516 | 6/1966 | Melia et al. | 340—172.5 |
| 3,266,024 | 8/1966 | Kersey et al. | 340—172.5 |
| 3,310,780 | 3/1967 | Gilley et al. | 340—172.5 |

OTHER REFERENCES

Computer Logic, Flores, 1960, Prentice Hall, pp. 148, 255–257, 283–284.

PAUL J. HENON, *Primary Examiner.*

ROBERT C. BAILEY, M. LISS, *Assistant Examiners.*